United States Patent

[11] 3,587,062

[72] Inventor Dixson Teh-Chao Jen
Monroe, Conn.
[21] Appl. No. 856,989
[22] Filed Sept. 11, 1969
[45] Patented June 22, 1971
[73] Assignee The Bunker-Ramo Corporation
Stamford, Conn.

[54] READ-WRITE CONTROL SYSTEM FOR A RECIRCULATING STORAGE MEANS

14 Claims, 3 Drawing Figs.

[52] U.S. Cl. .......... 340/173 A, 340/172.5
[51] Int. Cl. .......... G11c 21/00
[50] Field of Search .......... 340/172.5, 173; 333/29, 30

[56] References Cited
UNITED STATES PATENTS
3,299,406 1/1967 Isberg .......... 340/172.5
3,414,887 12/1968 Scantlin .......... 340/172.5

*Primary Examiner*—Terrell W. Fears
*Attorney*—Frederick M. Arbuckle

ABSTRACT: A read-write control system for a recirculating storage medium which permits both the reading and writing of information on a track during a single recirculation of the storage medium while requiring the use of only a single read-write head on the track. Two tracks on the storage medium are designated as buffer storage tracks. Means are provided for storing information from a selected track onto a first of the buffer storage tracks, the storing of information from the first buffer storage track onto a second buffer storage track, and for storing information from the second buffer storage track back onto the selected storage track. The storing means are configured relative to the buffer storage tracks in a manner such that the time between the reading of a given piece of information from the selected track and the restoring of the given piece of information in the selected track is normally equal to the time required for one revolution of the storage medium. At least one of the storing means includes means for making the information available for reading as it is being written. Also, at least one of the storing means includes means for the selective storing of new information in place of information read from the preceding track. At least one of the storing means should also include a register means the contents of which may be detected. By varying the size of the register means, the information may be effectively shifted in one direction or the other.

Figure 1B:
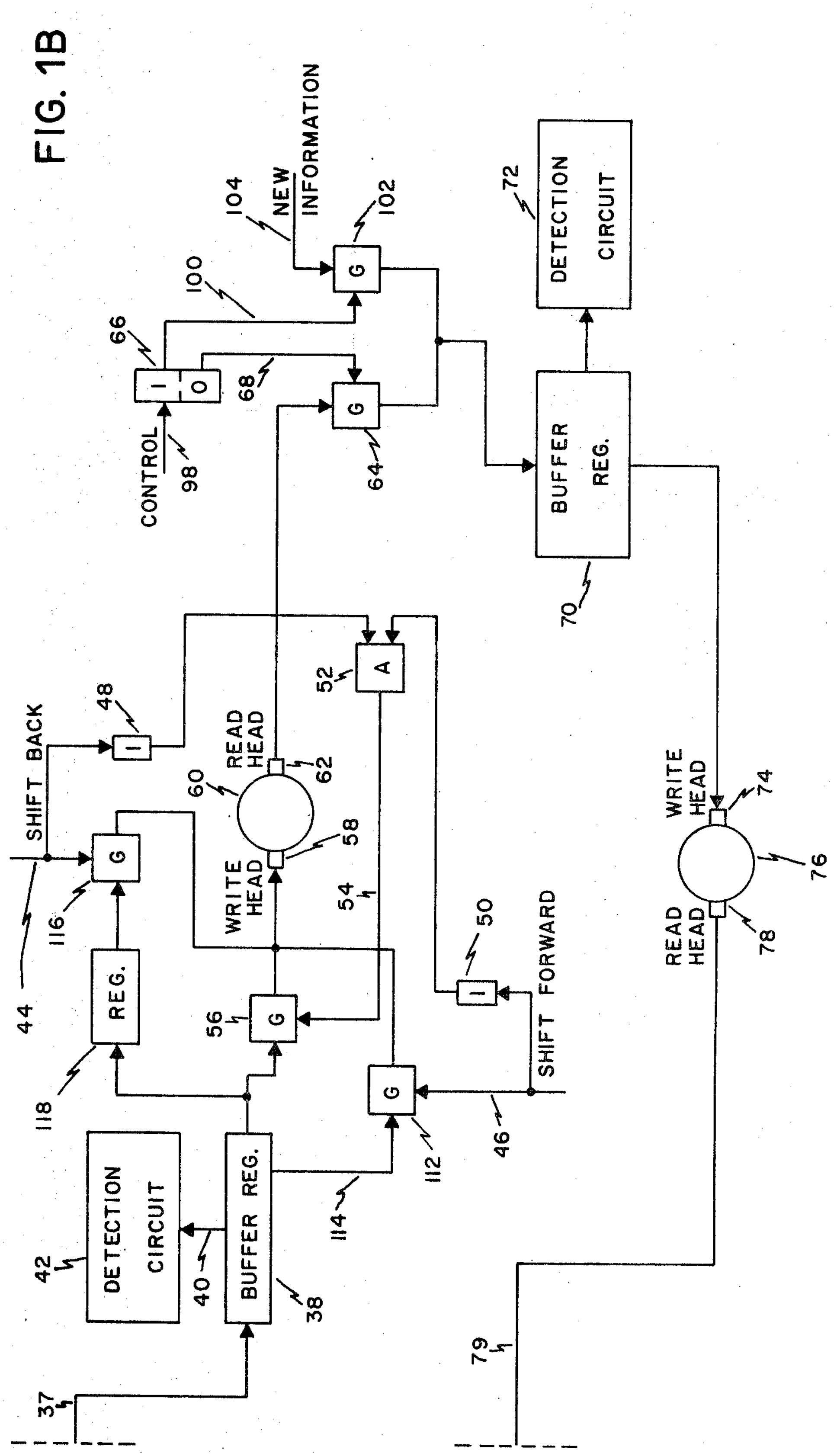

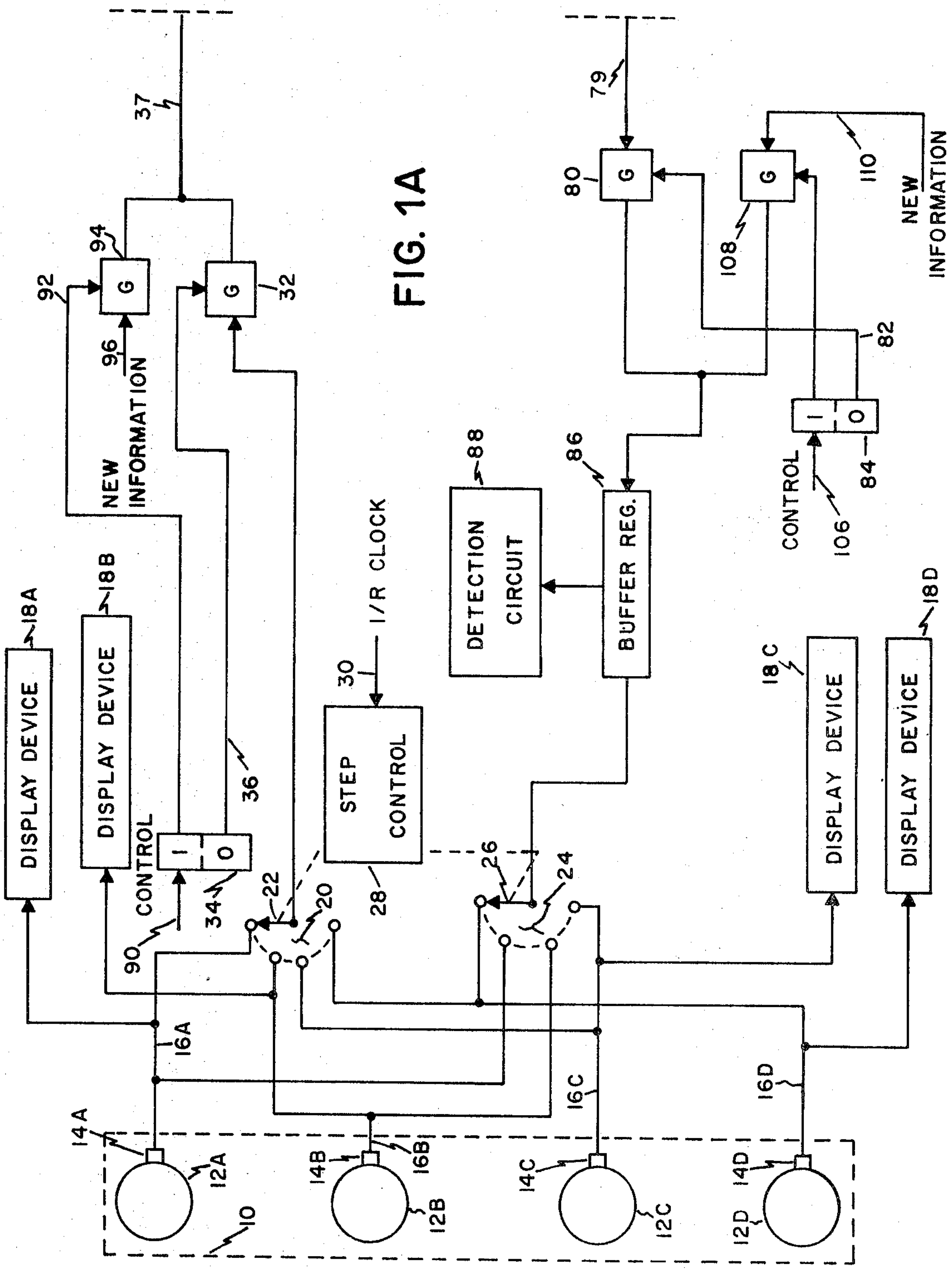
FIG. 1A
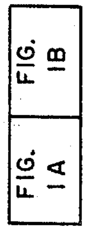
INVENTOR
BY DIXSON TEH-CHAO JEN
Ronald J. Kransdorf
ATTORNEY

READ-WRITE CONTROL SYSTEM FOR A RECIRCULATING STORAGE MEANS

This invention relates to a system for controlling the reading and writing of information from the tracks of a recirculating storage medium and more particularly to a circuit for both reading and writing information on a track during a single cycle of such a storage medium while requiring the use of only a single read-write head on the track.

In data processing systems, recirculating storage media, such as magnetic drums or magnetic disc, are generally utilized for the bulk storage of information. These devices, while adequate for most purposes, do have a number of limitations. For one thing, a head for reading a track on one of these devices cannot be placed too close to a head for writing on the track without causing information-destroying interference between the two heads. There are also mechanical problems in attempting to space the heads too closely. If, however, the heads are spaced 90° to 180° apart, as is required, a relatively large, and expensive, auxiliary buffer is required between the two heads in order to prevent loss of information.

In order to avoid the cost of these buffers, and also the significant cost of the extra head on each track, most drums and discs employ a single read-write head per track. With such an arrangement, the head is normally in a read condition. When a signal is received indicating that it is desired to write information on the track, the head is switched to a write condition. However, this switching operation takes about 30 microseconds during which time from 30 to 50 bits may pass under the head. These bits are subjected to transient signals from the head which could destroy any information stored therein. Therefore, present practice is to switch the head during a selected time in the cycle of the medium when blank data is known to be under the head and to then leave the head in the write mode for a complete revolution of the storage medium, switching it back to its read condition when the blank area of the track is again under the head.

The mode of operation described above is adequate for most applications. However, when the storage medium is, for example, being used to refresh the display on a display device such as a cathode-ray tube (CRT), it is necessary to read the contents of the track during each revolution of the memory in order to maintain the refresh rate required for flicker-free display. Thus, the use of a single read-write head, as described above, results in a degradation of the display which varies as a function of the amount of writing which is performed.

In the application indicated above, and other applications when editing of the stored information may be required, the standard drum/disk read-write control circuitry is again inadequate. For example, a shift operation requires that information be read out from one storage position on the drum and rewritten in another storage position which is either advanced or retarded from the original position. Such an operation can obviously not be performed in a system which is capable of only reading or writing during a single cycle. A similar problem occurs where it is desired to write, or to start writing, when a particular character is detected in the memory. Other editing functions which cannot be performed with existing disc or drum systems includes an insert-delete instruction which causes the deleting of characters from a selected position and the rewriting of these characters in another position and editing functions requiring the detection of two successive characters in order to key the action. Such functions are obviously impossible with existing hardware.

It is therefore apparent that an improved read-write access system for recirculating storage media such as magnetic discs and drums is required. Such a system should permit both the reading and writing of information from a track of the medium during a single revolution thereof. It should also permit access to a number of characters to be had at any given time and should permit shifting of characters in either direction to be easily performed.

It is therefore a primary object of this invention to provide an improved read-write control system for a recirculating storage medium such as a magnetic disc or a magnetic drum.

A more specific object of this invention is to provide a system which permits both reading and writing of data from a track of such a storage medium while requiring only a single read-write head.

Another object of this invention is to provide a system of the type indicated above which permits a plurality of characters to be simultaneously accessed.

Still another object of this invention is to provide a system of the type described above which permits information on a track to be easily shifted in either direction.

Another object of this invention is to provide a system of the type described above which is relatively simple and inexpensive.

In accordance with these objects this invention provides a system for permitting the reading and writing of information from a track of a recirculating storage medium during a single revolution of the medium while requiring the use of only a single read-write head on the track. The system includes a means for selecting the track on the storage medium into which information is to be written. Two tracks on the storage medium are designated as buffer storage tracks. A first means is provided for storing information from the selected track onto the first buffer storage track, a second means is provided for storing information from the first buffer storage track onto a second buffer storage track, and a third means is provided for storing information from the second buffer storage track back onto the selected track. The storing means are configured relative to the buffer storage tracks in a manner such that the time between the reading of a given piece of information from the selected track by the first storing means and the restoring of the given piece of information in the selected track by the third storing means is normally equal to the time required for one revolution of the storage medium. At least the third storing means includes means for making the information available for reading as it is being written. Also, at least one of the storing means includes means for the selective storing of new information in place of information read from the preceding track. At least one of the storing means should also include a register means the contents of which may be detected. By varying the size of the register means, the information may be effectively shifted in one direction or the other.

The foregoing and other objects, features and advantages of the invention will be apparent from the following more particular description of preferred embodiments of the invention, as illustrated in the accompanying drawings.

In the drawings:

FIGS. 1A and 1B, when taken together, form a schematic block diagram of a first illustrative embodiment of the invention.

Figure 2:
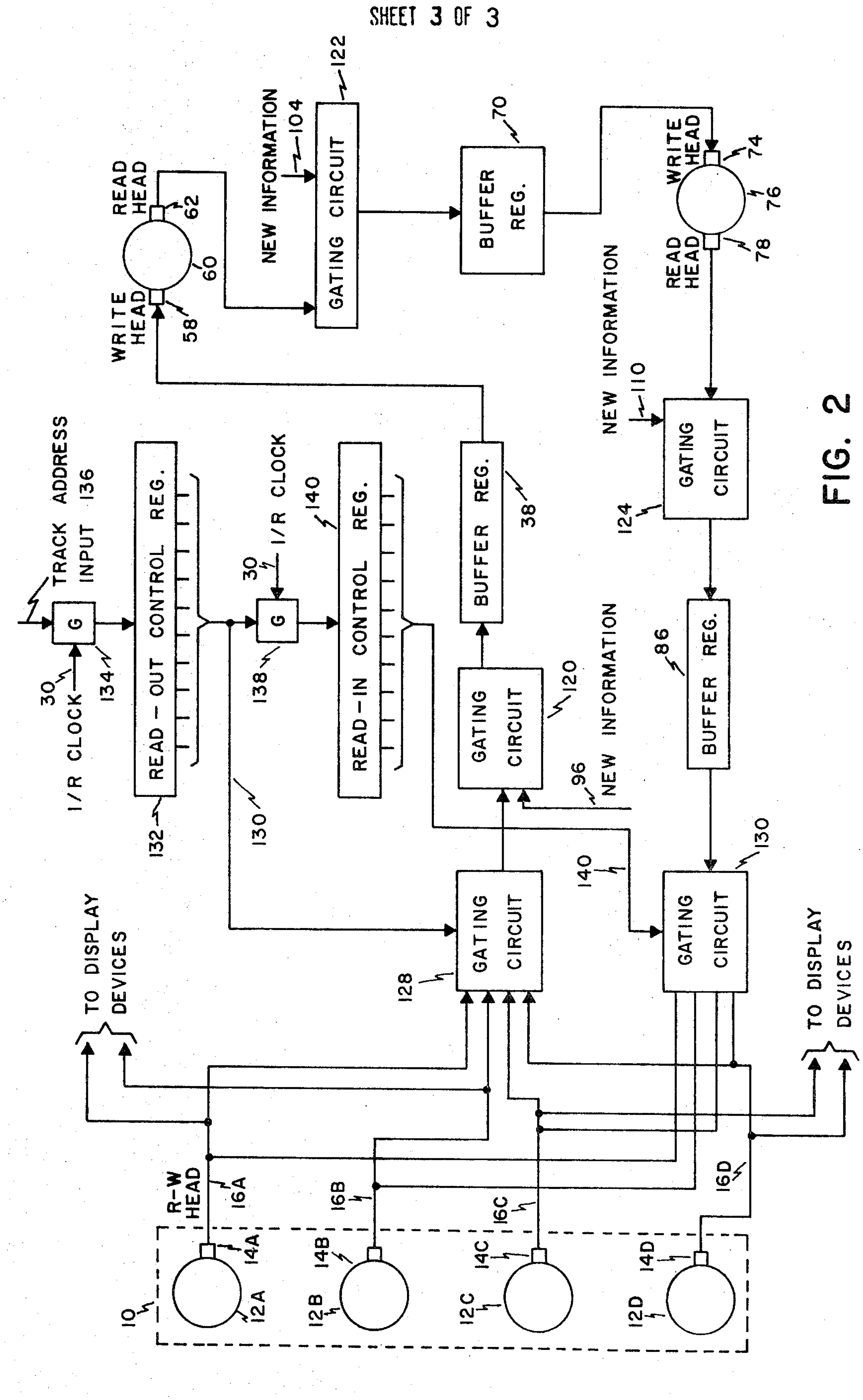

FIG. 2 is a schematic block diagram of a second illustrative embodiment of the invention.

Referring now to FIG. 1A, it is seen that the illustrative embodiment of the invention includes a recirculating storage device 10 which, for purposes of the following discussion, will be assumed to be a magnetic drum. While drum 10 would normally have a large number of information storage tracks, in order to simplify the following description only four information storage tracks 12A—12D are shown in the figure. Each of these tracks has a single read-write head 14 which is connected to a track input-output line 16. Lines 16 are connected as the intensity control inputs to display devices 18. These devices will be assumed to be CRT's. Thus, for each revolution of a track 12, a complete retrace of a frame is performed on the corresponding CRT display.

Lines 16 are also connected to the terminals of a first stepping switch 20 having a rotating arm 22 and a second stepping switch 24 having a rotating arm 26. Arms 22 and 26 are ganged together and the stepping of these arms is controlled by step control circuit 28. Step control circuit 28 is energized once per revolution of a track 12 in response to a 1/R clock from drum 10.

In operation, heads 14 are normally in a read condition. This permits the information on tracks 12 to be applied to control the display on display device 18. With the illustrative embodiment shown in FIG. 1, this also causes the contents of a given track 12 to be applied to gate 32 on every fourth revolution of the drum. As long as new information is not to be written on the track applying information through switch 22 to gate 32, flip-flop 34 is in its ZERO state generating an output on line 36 which conditions gate 32 to apply the track output through line 37 to buffer register 38 (FIG. 1B).

Register 38 may be a standard flip-flop shift register the length of which is determined by the functions which it is to preform. In the figure, the contents of buffer 38 are shown as being applied through lines 40 to detection circuit 42. Detection circuit 42 may, for example, be a bank of one or more AND gates which are adapted to generate outputs when selected characters or character combinations appear in buffer 38. Thus, detector 42 may be set to detect a start-of-message or end-of-message character, or a marker bit in a character indicating that this is the next character which is to be written into.

If a shift operation is not being performed, there is no signal on either shift-back line 44 or shift-forward line 46 and inverters 48 and 50 are therefore both generating outputs to fully condition AND gate 52. The resulting output signal on line 54 is applied to condition gate 56 to pass the output from buffer register 38 to write head 58 on buffer track 60 of drum 10. Buffer track 60 is another track on drum 10 and differs from information tracks 12 only in that it has a separate write head 58 and read head 62 rather than utilizing a single head 14 for both functions. The spacing between heads 58 and 62 is slightly less than 180°, the exact spacing being a function of the length of buffer 38 and the other buffers to be described shortly. More will be said about the spacing between these heads later.

When the information written on track 60 by head 58 has circulated the required distance, it is read by head 62. Information read by head 62 is applied as the information input to gate 64. If no new information is to be read into the track, flip-flop 66 is in its ZERO state at this time generating an output on line 68 which conditions gate 64 to pass the information read by head 62 through gate 64 to buffer register 70. Buffer register 70 may also be a flip-flop shift register the length of which is determined by the function which it is to perform. The contents of register 70 are detected by detection circuit 72. This circuit could be the same as detection circuit 42 except that it would generally be set up to detect different characters. Detection circuit 72 could, for example, be utilized to detect certain synchronizing codes which require two consecutive characters of, for example, all zeros. Thus, if a zero is detected in both buffer 38 and buffer 70, a synchronization signal would be generated.

The output from buffer 70 is applied to write head 74 of a second buffer track 76. Track 76 is the same as buffer track 60 and the same criteria apply for the spacing between its write head 74 and its read head 78. The information read by head 78 is applied through line 79 as the information input to gate 80 (FIG. 1A). Gate 80 is conditioned by a signal on ZERO-side output line 82 from flip-flop 84. Flip-flop 84 will be in its ZERO state except when information is to be written into the track at that point in the circuit. Information passed through gate 80 is stored in a third buffer register 86. This register is like the registers 38 and 70 and may be utilized for similar purposes. Again, a detection circuit 88 is provided.

The output from buffer register 86 is applied through arm 26 of stepping switch 24 to the line 16 for the appropriate track 12. The normal delay in the loop between switches 20 and 24 is exactly equal to the time required for one complete revolution of drum 10. In order to achieve this desired delay, the sum of the bits in buffers 38, 70 and 86 is determined and the read and write heads on tracks 60 and 76 are spaced by a distance which is less than half a track or 180° by an amount equal to half of the determined sum. It is of course possible to maintain the half-track spacing between the heads on one of the buffer tracks and to reduce the spacing between the heads by the full determined sum on the other track, or to adjust the head spacings in some other desired manner such that the sum of the difference between 180° and the spacing between the heads on the two buffer tracks is equal to the sum of the number of bits which may be stored in the buffer registers.

With a one revolution delay in the loop, information which was originally read by a head 14 to be applied to the loop is written into the same position on the same track when the information comes out of the loop one cycle later. It should be noted, however, that during this cycle, a 1/R clock signal appears on line 30, causing both switch arms 22 and 26 to be advanced. This switching will occur during a dead period or so-called guard space arranged to occur at the end of each track. At the same time, the head 14 which was used to read information into the buffer loop is switched to its write condition. This stepping of the switches between the read and the write operation is the reason that switch 20 is one track position advanced from switch 24. Since the switching of a head 14 from the read to the write mode occurs during the dead period at the end of each track, no information is lost. When the tracks are being used to control display devices, as is the case for the preferred embodiment of the invention, this dead space corresponds to the retrace of the CRT writing beam which occurs at the end of each frame.

It will be remembered that in order to obtain a flicker-free display on a CRT, refresh signals are required from tracks 12 during each revolution of the drum. However, as was indicated previously, this refresh signal cannot be obtained from a track 12 when its read-write head 14 is in its write condition. It should be noted that this problem is overcome in the circuit of FIG. 1A and FIG. 1B by applying the information which is to be written from switch 24 through the corresponding line 16 to both write head 14 and the corresponding display device. Thus, during a cycle that writing is being performed on a track 12, its display device receives its refresh input from the loop between switches 20 and 24. At the end of this cycle, head 14 is switched back to its read condition permitting normal refresh of the screen to be resumed.

In the discussion so far it has been assumed that no information is to be written into memory and the information from a track has therefore merely been recirculated. However, there are three points in the loop between the stepping switches at which new information may be added. If, for example, an entire track is to be rewritten, flip-flop 34 could be set to its ONE state by a signal on control line 90 at the beginning of the memory cycle and reset at the end of the cycle in some suitable manner. Control signals on line 90 and the other control lines in FIG. 1 would be derived from external write control circuits which do not form part of the present invention. Where a single word or character is to be added at a known position in the recirculation cycle, control line 90 could cause flip-flop 34 to be set at the beginning of the selected word or character time and reset at the end of this time. The setting of flip-flop 34 to its ONE state terminates the signal on line 36, blocking the passage of the old information stored on the track, and the appearance of a signal on line 92 to condition gate 94 to pass new information on line 96 into buffer 38. It should be noted that since the setting of flip-flop 34 to its ONE state effectively blocks the passage of existing information from the track, erasure of a track, line or character may be effected by setting flip-flop 34 to its ONE state and not applying any new information to line 96.

New information may also be applied to the system by applying a signal to control line 98 to set flip-flop 66 to its ONE state. This results in the termination of the signal on line 68, deconditioning gate 64 to block the passage of old information, and the appearance of a signal on line 100 conditioning gate 102 to pass new information on line 104 to buffer 70. The introduction of information at this point in the circuit might for example occur where information is to be entered at the character position where a marker bit is detected. The marker bit would be detected in buffer 38 by a detector 42 and utilized by control circuitry (not shown) to set flip-flop 66 when the character containing the marker bit is read out of buffer track 60 by head 62. Another situation where it might be desired to write information at this point in the circuit would be where a particular field is erased by setting flip-flop 34 and new information is then written in this field by setting flip-flop 66.

Additional flexibility for editing functions is obtained by providing a third point in the circuit where information may be written. Thus, a control signal applied to line 106 sets flip-flop 84 to its ONE state, conditioning gate 108 to store new information on line 110 in buffer register 86 in place of information which would have normally been passed from buffer track 76 through gate 80. Writing might, for example, occur at this point where the joint detection of characters in both buffers 38 and 70 is required in order for a write operation to be performed, or where a shift operation has been performed in the preceding buffers and it is desired to write the information in a position which has been emptied by the shift.

In the discussion so far it has been assumed that the loop between switches 22 and 24 was exactly one track length long so that information read out during one cycle was rewritten in exactly the same clock position on the track during the following cycle. However, if the length of the loop is varied so that it is either longer or shorter than this length, an effective shift in the information stored on the track is performed. Thus, if a signal appears on shift forward line 46, gate 112 is conditioned and gate 56 deconditioned. The information input to gate 112 is output line 114 from a tap on buffer register 38. The output from gate 112 is applied to write head 58 of buffer track 60. Thus, the conditioning of gate 112 effectively shortens the loop between the stepping switches by an amount equal to the distance between the tap and the end of the register. Information is therefore rewritten in a position advanced by this amount from the position on the track from which it was read resulting in an effective shift forward of the information. Similarly, a signal on shift-back line 44 conditions gate 116 and deconditions gate 56. The input to gate 116 is the output from register 118 which register is connected in series with register 38. The output from gate 116 is also connected as the input to write head 58. Thus, when a signal appears on line 44 the length of register 38 is effectively increased by the length of register 118 resulting in information being rewritten to the position behind that from which it was read. An effective shift-back of information is in this manner effected. The shift operation just described may be performed on an entire track, or a single field, or even on a single character.

A circuit has thus been provided which permits the reading out of information from each track of a drum during every revolution of the drum, even when information is being written into the drum while using only a single read-write head per track. The circuit also permits a great variety of editing operations to be performed on the information which would not be possible with normal drum read-write systems. In particular, shifting of information may be easily effected.

While the circuit of FIGS. 1A and 1B is relatively simple, it permits information to be read into a given track only once per N revolutions of the drum where N is the number of information tracks on the drum. It also causes information from a track to be circulated through the buffer tracks once per N revolution of the drum regardless of whether information is to be written into the track or editing functions are to be performed on this information. It is apparent that, particularly on drums with a large number of information storage tracks, the write response time of this circuit is not very good. FIG. 2 shows a circuit which operates in a more efficient manner to provide a better write response time.

Referring now to FIG. 2 it is seen that, like in FIGS. 1A and 1B, there is a memory drum 10 having a plurality of information storage tracks 12 and there is a recirculation loop which includes buffer registers 38, 70 and 86 and buffer tracks 60 and 76. Like numbers have been used to designate like elements in both figures. In order to simplify FIG. 2, (1) detectors 42, 72 and 88 have not been shown although they could be utilized; (2) a shift control circuit to be used, for example, with buffer 38 has not been shown; and (3) the control and gating circuits for the receipt of new information have been shown in simplified form as gating circuits 120, 122 and 124. The way in which the circuit in FIG. 2 differs from that of FIG. 1 is that gating circuits 128 and 130 have been substituted for stepping switches 20 and 24. Each of the lines 16 is applied as the information input to a separate gate in gating circuit 128. The particular one of these gates which is conditioned at any given time is determined by a signal on one of the lines 132. At the end of each cycle, the signal on 1/R clock line 30 conditions gate 134 to pass the track address for the next track in which information is to be written or edited, which address on line 136, into register 132. Thus, the track which is to be accessed for each revolution of drum 10 may be selected by control circuitry (not shown) and the tracks may be accessed in any desired order.

The 1/R clock signal on line 30 also conditions gate 138 to pass the address in register 132 into read-in control register 140. The address in register 140 is applied through lines 142 to condition one of the gates in gating circuit 130. This causes the output from buffer register 86 to be applied to the line 16 from which information was derived during the previous cycle of the drum. Information is thus written back into the same track from which it was previously read. The circuit of FIG. 2 thus has all the advantages of the circuit of FIGS. 1A and 1B and is capable of performing all the functions of this circuit, but, in addition, has the advantage that the track to be accessed may be randomly selected.

It is apparent that while a shift circuit has been shown in conjunction with buffer 38 in FIG. 1B, such a shift circuit might operate in conjunction with any of the other buffers, or with more than one buffer, or that some other equivalent means could be utilized to either shorten or lengthen the spacing in the loop between switches 22 and 24. For example, some means might be provided to varying the spacing between the read and write heads on one or both of the buffer tracks. Similarly, in some applications, one or more of the buffers and/or detection circuits may be dispensed with depending on the editing functions which are to be performed. The number of places in the loop, and the exact positions in the loop at which writing occurs, and the exact manner in which such writing is performed and controlled, may also be varied while still remaining within the scope of the invention. Further, while two means have been shown for controlling the selection of tracks to be accessed, other equivalent means could be utilized. Finally, while two buffer tracks have been shown for the preferred embodiment of the invention, three or more buffer tracks might be utilized where additional access positions are required.

Thus, while the invention has particularly been shown and described with reference to preferred embodiments thereof, it will be understood by those skilled in the art that the foregoing and other changes in form and details may be made therein without departing from the spirit and scope of the invention.

What I claim is:

1. A system for both reading and writing information on a track of a recirculating storage medium during a single cycle of the medium while requiring the use of only a single read-write head on the track comprising:

means for selecting the track of said storage medium which is to be accessed;

a plurality of buffer storage tracks;

first means for storing information from said selected track onto a first of said buffer storage tracks;

second means for storing information from said each buffer storage track onto the succeeding buffer storage track; and third means for storing information from the last of said buffer storage track back onto said selected tracks;

said storing means being configured relative to said buffer storage tracks in a manner such that the time between the reading of a given piece of information from said selected track by said first storing means and the restoring of the given price of information in said selected track by said third storing means is normally equal to the time required for one cycle of said storage medium;

at least said third storing means of said storing means including means for making said information available for reading as it is being written; and at least one of said storing means including means for selectively storing new information in place of the information read from the preceding track.

2. A system of the type described in claim 1 wherein there are two of said buffer storage tracks; and wherein said second storing means is effective to store information from the first of said tracks to the second of said tracks.

3. A system of the type described in claim 1 wherein said buffer storage tracks are on said storage medium.

4. A system of the type described in claim 1 wherein there are a plurality of tracks on said storage medium; and including means for causing said first storing means to be storing information from a new selected track while said third storing means is restoring the information read from a selected track during the preceding cycle of said storage medium.

5. A system of the type described in claim 1 wherein at least one of said storing means includes register means adapted to store a predetermined number of information bits.

6. A system of the type described in claim 5 including means for varying the number of bits stored by said register means whereby an effective shift of the information on the selected track may be effected.

7. A system of the type described in claim 5 including means for detecting the contents of said register means.

8. A system of the type described in claim 5 wherein the number of bits of information between the read and the write heads on each of said buffer storage tracks is less than 1/N the number of bits on a track, where N is the number of buffer tracks, by a predetermined amount, the sum of said predetermined amounts for said buffer tracks being equal to the sum of the predetermined number of bits stored in said register means.

9. A system of the type described in claim 1 wherein said means for selectively storing new information includes gating means normally adapted to pass information from the preceding track, and control means adapted to cause said gating means to selectively block the information from the preceding track and to pass new information in its stead.

10. A system of the type described in claim 1 wherein said track selecting means includes a pair of ganged stepping switches, with the switch for read control being one track ahead of the switch for write control, and means for stepping said switches once for each cycle of said storage medium.

11. A system of the type described in claim 1 wherein said track selecting means includes a gating circuit for track reading, a gating circuit for track writing, register means for controlling each of said gating circuits, means for storing the address of a selected track in the read control register, and means operative once per cycle of said storage medium for transferring the contents of the read control register to the write control register.

12. A system of the type described in claim 1 including means operative between the reading of information by said first storing means and the writing of information by said third storing means for effectively shifting said information.

13. A system of the type described in claim 12 wherein said shifting means includes means for varying the delay between said reading by said first storing means and said writing by said third storing means.

14. A system of the type described in claim 1 including a display device;

means for normally applying the information read from a track of said storage medium to control the display on said display device; and means operative when said track is being written into by said third storing means for applying the output from said third storing means to control said display.